United States Patent
Dowling et al.

(10) Patent No.: US 7,031,920 B2
(45) Date of Patent: Apr. 18, 2006

(54) LIGHTING CONTROL USING SPEECH RECOGNITION

(75) Inventors: Kevin J. Dowling, Westford, MA (US); George G. Mueller, Boston, MA (US)

(73) Assignee: Color Kinetics Incorporated, Boston, MA (US)

( * ) Notice: Subject to any disclaimer, the term of this patent is extended or adjusted under 35 U.S.C. 154(b) by 757 days.

(21) Appl. No.: 09/917,294

(22) Filed: Jul. 26, 2001

(65) Prior Publication Data

US 2002/0044066 A1   Apr. 18, 2002

Related U.S. Application Data

(63) Continuation-in-part of application No. 09/669,121, filed on Sep. 25, 2000, which is a continuation of application No. 09/425,770, filed on Oct. 22, 1999, now Pat. No. 6,150,774, which is a continuation of application No. 08/920,156, filed on Aug. 26, 1997, now Pat. No. 6,016,038, application No. 09/917,294, which is a continuation-in-part of application No. 09/815,418, filed on Mar. 22, 2001, which is a continuation-in-part of application No. 09/742,017, filed on Dec. 20, 2000, which is a continuation of application No. 09/626,905, filed on Jul. 27, 2000, which is a continuation-in-part of application No. 09/333,739, filed on Jun. 15, 1999, which is a continuation-in-part of application No. 09/215,624, filed on Dec. 17, 1998, which is a continuation-in-part of application No. 09/213,607, filed on Dec. 17, 1998, which is a continuation-in-part of application No. 09/213,189, filed on Dec. 17, 1998, which is a continuation-in-part of application No. 09/213,581, filed on Dec. 17, 1998, which is a continuation-in-part of application No. 09/213,540, filed on Dec. 17, 1998, which is a continuation of application No. 09/213,548, filed on Dec. 17, 1998, now Pat. No. 6,166,496, said application No. 09/213,548 is a continuation of application No. 09/213,659, filed on Dec. 17, 1998.

(60) Provisional application No. 60/221,363, filed on Jul. 27, 2000, provisional application No. 60/090,920, filed on Jun. 26, 1998, provisional application No. 60/079,285, filed on Mar. 25, 1998, provisional application No. 60/078,861, filed on Mar. 20, 1998, provisional application No. 60/068,792, filed on Dec. 24, 1997, provisional application No. 60/071,281, filed on Dec. 17, 1997.

(51) Int. Cl.
*G10L 21/00* (2006.01)

(52) U.S. Cl. .................. 704/270; 704/275; 704/276

(58) Field of Classification Search ................ 704/275, 704/270, 276; 362/231, 101
See application file for complete search history.

(56) References Cited

U.S. PATENT DOCUMENTS

| | | |
|---|---|---|
| 1,654,068 A | 12/1927 | Blattner |
| 2,909,097 A | 10/1959 | Alden et al. |
| 3,318,185 A | 5/1967 | Kott |
| 3,561,719 A | 2/1971 | Grindle |
| 3,586,936 A | 6/1971 | McLeroy |
| 3,601,621 A | 8/1971 | Ritchie |
| 3,643,088 A | 2/1972 | Osteen et al. |
| 3,746,918 A | 7/1973 | Drucker et al. |
| 3,818,216 A | 6/1974 | Larraburu |
| 3,832,503 A | 8/1974 | Crane |
| 3,858,086 A | 12/1974 | Anderson et al. |
| 3,909,670 A | 9/1975 | Wakamatsu et al. |
| 3,924,120 A | 12/1975 | Cox, III |
| 3,958,885 A | 5/1976 | Stockinger et al. |
| 3,974,637 A | 8/1976 | Bergey et al. |
| 4,001,571 A | 1/1977 | Martin |
| 4,054,814 A | 10/1977 | Fegley et al. |
| 4,082,395 A | 4/1978 | Donato et al. |
| 4,096,349 A | 6/1978 | Donato |
| 4,241,295 A | 12/1980 | Williams, Jr. |
| 4,272,689 A | 6/1981 | Crosby et al. |
| 4,273,999 A | 6/1981 | Pierpoint |
| 4,298,869 A | 11/1981 | Okuno |

| Patent | Date | Inventor |
|---|---|---|
| 4,329,625 A | 5/1982 | Nishizawa et al. |
| 4,367,464 A | 1/1983 | Kurahashi et al. |
| 4,388,567 A | 6/1983 | Yamazaki et al. |
| 4,388,589 A | 6/1983 | Molldrem, Jr. |
| 4,392,187 A | 7/1983 | Bornhorst |
| 4,420,711 A | 12/1983 | Takahashi et al. |
| 4,500,796 A | 2/1985 | Quin |
| 4,622,881 A | 11/1986 | Rand |
| 4,625,152 A | 11/1986 | Nakai |
| 4,635,052 A | 1/1987 | Aoike et al. |
| 4,647,217 A | 3/1987 | Havel |
| 4,656,398 A | 4/1987 | Michael et al. |
| 4,668,895 A | 5/1987 | Schneiter |
| 4,682,079 A | 7/1987 | Sanders et al. |
| 4,686,425 A | 8/1987 | Havel |
| 4,687,340 A | 8/1987 | Havel |
| 4,688,154 A | 8/1987 | Nilssen |
| 4,688,869 A | 8/1987 | Kelly |
| 4,695,769 A | 9/1987 | Schweickardt |
| 4,701,669 A | 10/1987 | Head et al. |
| 4,705,406 A | 11/1987 | Havel |
| 4,707,141 A | 11/1987 | Havel |
| 4,727,289 A | 2/1988 | Uchida |
| 4,740,882 A | 4/1988 | Miller |
| 4,753,148 A | 6/1988 | Johnson |
| 4,771,274 A | 9/1988 | Havel |
| 4,780,621 A | 10/1988 | Bartleucci et al. |
| 4,818,072 A | 4/1989 | Mohebban |
| 4,837,565 A | 6/1989 | White |
| 4,843,627 A | 6/1989 | Stebbins |
| 4,845,481 A | 7/1989 | Havel |
| 4,845,745 A | 7/1989 | Havel |
| 4,863,223 A | 9/1989 | Weissenbach et al. |
| 4,874,320 A | 10/1989 | Freed et al. |
| 4,887,074 A | 12/1989 | Simon et al. |
| 4,922,154 A | 5/1990 | Cacoub |
| 4,934,852 A | 6/1990 | Havel |
| 4,962,687 A | 10/1990 | Belliveau et al. |
| 4,965,561 A | 10/1990 | Havel |
| 4,973,835 A | 11/1990 | Kurosu et al. |
| 4,979,081 A | 12/1990 | Leach et al. |
| 4,980,806 A | 12/1990 | Taylor et al. |
| 4,992,704 A | 2/1991 | Stinson |
| 5,003,227 A | 3/1991 | Nilssen |
| 5,008,595 A | 4/1991 | Kazar |
| 5,010,459 A | 4/1991 | Taylor et al. |
| 5,027,262 A | 6/1991 | Freed |
| 5,034,807 A | 7/1991 | Von Kohorn |
| 5,072,216 A | 12/1991 | Grange |
| 5,078,039 A | 1/1992 | Tulk et al. |
| 5,083,063 A | 1/1992 | Brooks |
| 5,086,385 A | 2/1992 | Launey et al. |
| 5,126,634 A | 6/1992 | Johnson |
| 5,128,595 A | 7/1992 | Hara |
| 5,134,387 A | 7/1992 | Smith et al. |
| 5,142,199 A | 8/1992 | Elwell |
| 5,154,641 A | 10/1992 | McLaughlin |
| 5,164,715 A | 11/1992 | Kashiwabara et al. |
| 5,184,114 A | 2/1993 | Brown |
| 5,194,854 A | 3/1993 | Havel |
| 5,209,560 A | 5/1993 | Taylor et al. |
| 5,225,765 A | 7/1993 | Callahan et al. |
| 5,226,723 A | 7/1993 | Chen |
| 5,254,910 A | 10/1993 | Yang |
| 5,256,948 A | 10/1993 | Boldin et al. |
| 5,282,121 A | 1/1994 | Bornhorst et al. |
| 5,294,865 A | 3/1994 | Haraden |
| 5,307,295 A | 4/1994 | Taylor et al. |
| 5,329,431 A | 7/1994 | Taylor et al. |
| 5,350,977 A | 9/1994 | Hamamoto et al. |
| 5,357,170 A | 10/1994 | Luchaco et al. |
| 5,371,618 A | 12/1994 | Tai et al. |
| 5,374,876 A | 12/1994 | Horibata et al. |
| 5,388,357 A | 2/1995 | Malita |
| 5,402,702 A | 4/1995 | Hata |
| 5,404,282 A | 4/1995 | Klinke et al. |
| 5,406,176 A | 4/1995 | Sugden |
| 5,410,328 A | 4/1995 | Yoksza et al. |
| 5,412,284 A | 5/1995 | Moore et al. |
| 5,412,552 A | 5/1995 | Fernandes |
| 5,420,482 A | 5/1995 | Phares |
| 5,421,059 A | 6/1995 | Leffers, Jr. |
| 5,432,408 A | 7/1995 | Matsuda et al. |
| 5,436,535 A | 7/1995 | Yang |
| 5,461,188 A | 10/1995 | Drago et al. |
| 5,463,280 A | 10/1995 | Johnson |
| 5,465,144 A | 11/1995 | Parker et al. |
| 5,489,827 A | 2/1996 | Xia |
| 5,491,402 A | 2/1996 | Small |
| 5,504,395 A | 4/1996 | Johnson et al. |
| 5,545,950 A | 8/1996 | Cho |
| 5,561,346 A | 10/1996 | Byrne |
| 5,575,459 A | 11/1996 | Anderson |
| 5,575,554 A | 11/1996 | Guritz |
| 5,592,051 A | 1/1997 | Korkala |
| 5,640,061 A | 6/1997 | Bornhorst et al. |
| 5,642,129 A | 6/1997 | Zavracky et al. |
| 5,673,059 A | 9/1997 | Zavracky et al. |
| 5,701,058 A | 12/1997 | Roth |
| 5,721,471 A | 2/1998 | Begemann et al. |
| 5,734,590 A | 3/1998 | Tebbe |
| 5,751,118 A | 5/1998 | Mortimer |
| 5,752,766 A | 5/1998 | Bailey et al. |
| 5,769,527 A | 6/1998 | Taylor et al. |
| 5,803,579 A | 9/1998 | Turnbull et al. |
| 5,808,689 A | 9/1998 | Small |
| 5,821,695 A | 10/1998 | Vilanilam et al. |
| 5,848,837 A | 12/1998 | Gustafson |
| 5,850,126 A | 12/1998 | Kanbar |
| 5,851,063 A | 12/1998 | Doughty et al. |
| 5,852,658 A | 12/1998 | Knight et al. |
| RE36,030 E | 1/1999 | Nadeau |
| 5,859,508 A | 1/1999 | Ge et al. |
| 5,896,010 A | 4/1999 | Mikolajczak et al. |
| 5,912,653 A | 6/1999 | Fitch |
| 5,924,784 A | 7/1999 | Chliwnyj et al. |
| 5,946,209 A | 8/1999 | Eckel et al. |
| 5,952,680 A | 9/1999 | Strite |
| 5,959,547 A | 9/1999 | Tubel et al. |
| 5,963,185 A | 10/1999 | Havel |
| 5,974,553 A | 10/1999 | Gandar |
| 6,008,783 A | 12/1999 | Kitagawa et al. |
| 6,016,038 A | 1/2000 | Mueller et al. |
| 6,018,237 A | 1/2000 | Havel |
| 6,025,550 A | 2/2000 | Kato |
| 6,031,343 A | 2/2000 | Recknagel et al. |
| 6,068,383 A | 5/2000 | Robertson et al. |
| 6,072,280 A | 6/2000 | Allen |
| 6,095,661 A | 8/2000 | Lebens et al. |
| 6,097,352 A | 8/2000 | Zavracky et al. |
| 6,132,072 A | 10/2000 | Turnbull et al. |
| 6,135,604 A | 10/2000 | Lin |
| 6,150,774 A | 11/2000 | Mueller et al. |
| 6,166,496 A | 12/2000 | Lys et al. |
| 6,183,086 B1 | 2/2001 | Neubert |
| 6,184,628 B1 | 2/2001 | Ruthenberg |
| 6,188,986 B1 * | 2/2001 | Matulich et al. ............ 704/275 |
| 6,196,471 B1 | 3/2001 | Ruthenberg |
| 6,211,626 B1 | 4/2001 | Lys et al. |
| 6,215,409 B1 | 4/2001 | Blach |
| 6,241,362 B1 * | 6/2001 | Morrison .................... 362/231 |
| 6,250,774 B1 | 6/2001 | Begemann et al. |
| 6,292,901 B1 | 9/2001 | Lys et al. |
| 6,340,868 B1 | 1/2002 | Lys et al. |
| 6,459,919 B1 | 10/2002 | Lys et al. |
| 2001/0033488 A1 | 10/2001 | Chliwnyj et al. |

FOREIGN PATENT DOCUMENTS

| | | |
|---|---|---|
| AU | 6 267 9 | 12/1996 |
| CA | 2 178 432 | 12/1996 |
| EP | 0 495 305 A2 | 7/1992 |
| EP | 0534710 B1 | 1/1996 |
| EP | 0752632 A2 | 1/1997 |
| EP | 0752632 A3 | 8/1997 |
| EP | 0 823 813 A2 | 2/1998 |
| EP | 0823812 A2 | 2/1998 |
| EP | 0935234 A1 | 8/1999 |
| EP | 0942631 A2 | 9/1999 |
| EP | 1020352 A2 | 7/2000 |
| EP | 1113215 A2 | 7/2001 |
| FR | 88 17359 | 12/1998 |
| GB | 2 045 098 A | 10/1980 |
| GB | 2135536 A | 8/1984 |
| GB | 2176042 A | 12/1986 |
| JP | 06043830 | 2/1994 |
| JP | 7-39120 | 7/1995 |
| JP | 8-106264 | 4/1996 |
| JP | 9 320766 | 12/1997 |
| WO | WO 89/05086 | 6/1989 |
| WO | WO 94/18809 | 8/1994 |
| WO | WO 95/13498 | 5/1995 |
| WO | WO 96/41098 | 12/1996 |

OTHER PUBLICATIONS

International Search Report from PCT Application PCT/US01/23475.

Home Automated Living: HALbasic, pp. 1-2; website: http://www.automatedliving.com/products_halbas.shtml.

Home Automated Living: HALdeluxe, pp. 1-2; website: http://www.automatedliving.com/products_haldel.shtml.

Home Automated Living: HAL2000, pp. 1-3; website: http://www.automatedliving.com/products_hal2000.shtml.

LM117/LM317A/LM317 3-Terminal Adjustable Regulator, National Semiconductor Corporation, May 1997, p. 1-20.

"DS96177 RS-485/RS-422 Differential Bus Repeater," National Semiconductor Corporation, Oct. 1993, pp. 1-8.

"DS2003/DS9667/DS2004 High Current/Voltage Darlington Drivers," National Semiconductor Corporation, Dec. 1995, pp. 1-8.

LM140A/LM140/LM340A/LM340/LM7800C Series 3-Terminal Positive Regulators, National Semiconductor Corporation, Jan. 1995, pp 1-14.

High End Systems, Inc. trackspot User Manual, Aug. 1997, Excerpts (Cover, Title page, pp. ii through iii and 2-13 through 2-14).

Artistic License, AL4000 DMX512 Processors, Revision 3.4 Jun. 2000, Excerpts (Cover, pp.7, 92 through 102).

Artistic License, Miscellaneous Drawings (3 sheets) Jan. 12, 1995.

Artistic License, Miscellaneous Documents (2 sheets Feb. 1995 and Apr. 1996).

\* cited by examiner

*Primary Examiner*—Susan McFadden
*Assistant Examiner*—Huyen X. Vo
(74) *Attorney, Agent, or Firm*—Foley Hoag LLP

(57) ABSTRACT

A system and method for the control of color-based lighting through voice control or speech recognition as well as a syntax for use with such a system. In this approach, the spoken voice (in any language) can be used to more naturally control effects without having to learn the myriad manipulation required of some complex controller interfaces. A simple control language based upon spoken words consisting of commands and values is constructed and used to provide a common base for lighting and system control.

28 Claims, 2 Drawing Sheets

LIGHTING CONTROL USING SPEECH RECOGNITION

RELATED APPLICATIONS

This Patent Application claims the benefit under 35 U.S.C. §119(e) of U.S. Provisional Application Ser. No. 60/221,363, filed Jul. 27, 2000, entitled "Lighting Control Using Speech Recognition."

This application also claims the benefit under 35 U.S.C. §120 as a continuation-in-part (CIP) of U.S. Non-provisional Application Ser. No. 09/669,121, filed Sep. 25, 2000, entitled "Multicolored LED Lighting Method and Apparatus", which is a continuation of U.S. Ser. No. 09/425,770, filed Oct. 22, 1999, now U.S. Pat. No. 6,150,774, which is a continuation of U.S. Ser. No. 08/920,156, filed Aug. 26, 1997, now U.S. Pat. No. 6,016,038.

This application also claims the benefit under 35 U.S.C. §120 as a continuation-in-part (CIP) of the following U.S. Non-provisional Applications:

Ser. No. 09/215,624, filed Dec. 17, 1998, entitled "Smart Light Bulb", which claims the benefit of the following provisional applications:
  Ser. No. 60/071,281, filed Dec. 17, 1997, entitled "Digitally Controlled Light Emitting Diodes Systems and Methods";
  Ser. No. 60/068,792, filed Dec. 24, 1997, entitled "Multi-Color Intelligent Lighting";
  Ser. No. 60/078,861, filed Mar. 20, 1998, entitled "Digital Lighting Systems";
  Ser. No. 60/079,285, filed Mar. 25, 1998, entitled "System and Method for Controlled Illumination"; and
  Ser. No. 60/090,920, filed Jun. 26, 1998, entitled "Methods for Software Driven Generation of Multiple Simultaneous High Speed Pulse Width Modulated Signals";

Ser. No. 09/213,607, filed Dec. 17, 1998, entitled "Systems and Methods for Sensor-Responsive Illumination";

Ser. No. 09/213,189, filed Dec. 17, 1998, entitled "Precision Illumination";

Ser. No. 09/213,581, filed Dec. 17, 1998, entitled "Kinetic Illumination";

Ser. No. 09/213,540, filed Dec. 17, 1998, entitled "Data Delivery Track";

Ser. No. 09/333,739, filed Jun. 15, 1999, entitled "Diffuse Illumination Systems and Methods";

Ser. No. 09/742,017, filed Dec. 20, 2000, entitled "Lighting Entertainment System", which is a continuation of U.S. Ser. No. 09/213,548, filed Dec. 17, 1998, now U.S. Pat. No. 6,166,496;

Ser. No. 09/815,418, filed Mar. 22, 2001, entitled "Lighting Entertainment System", which also is a continuation of U.S. Ser. No. 09/213,548, filed Dec. 17, 1998, now U.S. Pat. No. 6,166,496; and Ser. No. 09/626,905, filed Jul. 27, 2000, entitled "Lighting Components", which is a continuation of U.S. Ser. No. 09/213,659, filed Dec. 17, 1998, now U.S. Pat. No. 6,211,626.

BACKGROUND OF THE INVENTION

1. Field of the Invention

The invention relates to systems and methods for the programming of lighting, in particular to voice programming of lighting.

2. Description of Related Art

Known technology combines multiple light-emitting diodes LEDs in one or more packages with a microprocessor. This combination is provided in U.S. Pat. No. 6,016,038 the entire disclosure of which is herein incorporated by reference. This type of technology gives an enormous opportunity for control possibilities. The combination of the network and a controller allows the controller to access and control each of the devices on the network. This can be used to synchronize and coordinate more than one light to produce pleasing effects. Examples of such effects include the movement of color within a room, or the shift of a rainbow across the room or even the effect of the passage of time through the simulation of a sunrise and sunset across multiple lights in a room.

Turning lights on and off and then controlling the lights typically requires human interfaces that incorporate the use of standard devices such as hand or finger-actuated switches or knobs. Touch plates, switches, knobs, dials, sliders, rockers, and all manner of mechanical interfaces to electrical signals provide for control and manipulation of signals, which are then mapped to lighting changes. For colored lights, additional dimensions of representation and control complicate this. These include modification of hue, saturation or brightness or even temporal and geometric changes. This can include the modification of the rate of change of an effect or the effect itself.

SUMMARY OF THE INVENTION

In one embodiment, a simple control language based upon spoken words consisting of commands and values may be constructed and used to provide a common base for lighting and system control.

In another embodiment, a system for the control of color-based lighting through voice control may be presented. The system may be comprised of a transducer for taking in voice signals; a lighting system capable of controlling at least one lighting device wherein the lighting device is capable of producing multiple colors; and a computing device for converting the voice signals into signals that can be used by the lighting system to control said at least one lighting device.

In a further embodiment, a method for the control of color-based lighting may be presented. The method may comprise having a user speak a command in a syntax composed for use with a lighting system; translating the command into a signal to be used to control a lighting device, wherein the lighting device is capable of producing multiple colors, controlled by the lighting system; and using the signal to carry out an action on the lighting device, such that the action carried out corresponds to the command given.

DETAILED DESCRIPTION

Figure 1:
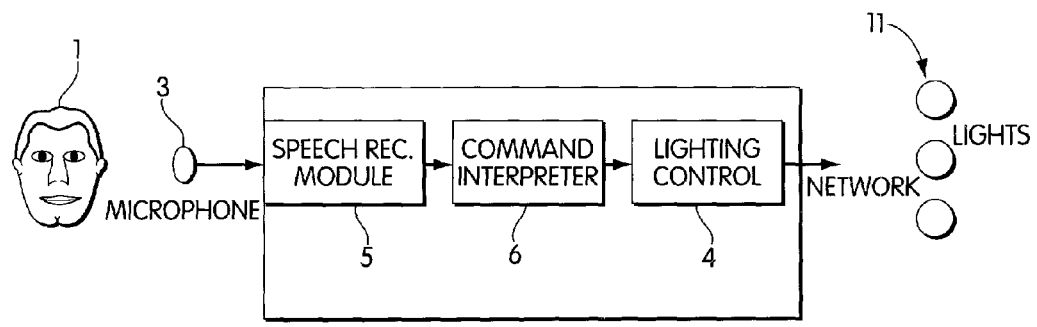
FIG. 1 shows a block diagram of a voice controlled lighting system according to one embodiment of the invention.

As shown in FIG. 1, one embodiment of the invention comprises several elements including a transducer 3, such as a microphone, which converts the acoustics of voice from the user 1 into an electrical signal. This electrical signal is then digitized and input into a computing device for processing. Speech recognition module 5 (which may be implemented in software) is then used to recognize the speech input and provide language output corresponding to the spoken words. This input becomes a command stream that is presented to a command interpreter 7 which then executes the command to the lighting control 9 and eventually the lights 11.

Figure 2:
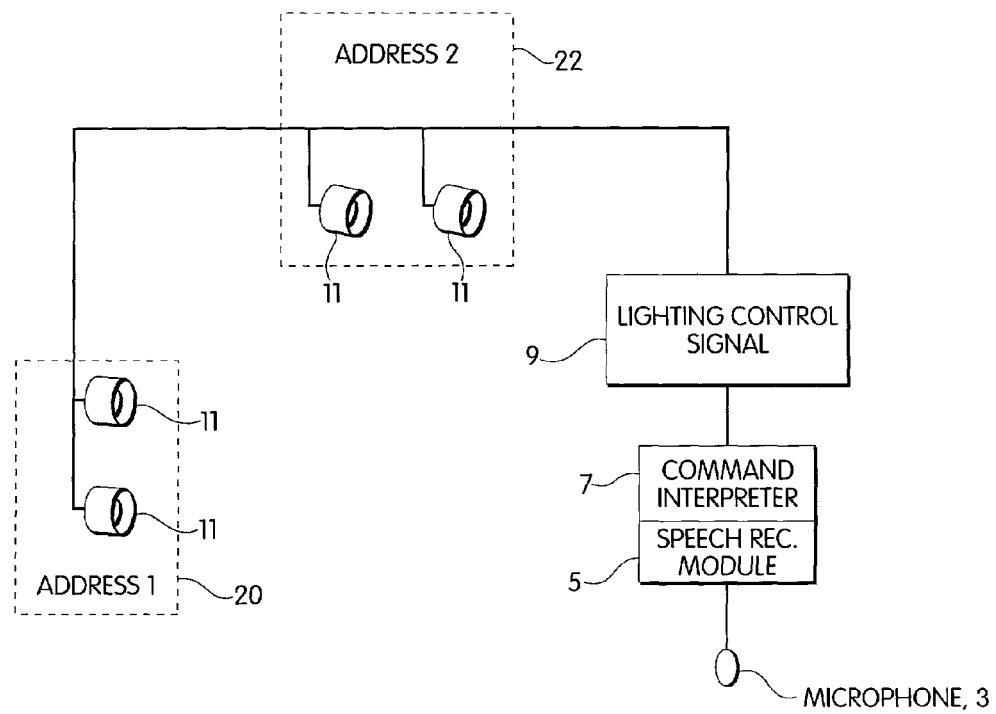
FIG. 2 illustrates the lighting system of FIG. 1 coupled to a lighting network.

FIG. 2 illustrates one possible arrangement of the lights 11 in accordance with an embodiment of the present invention. The lights 11 may be part of a network where each light has a unique address. The lighting control signals communicated from the lighting control 9 may include addressed data such that each of the individual lights 11 responds to commands corresponding to its particular address. In an embodiment, the particular light 11 may be chosen through a verbal command and the lighting control 9 may communicate instructions to the intended light 11. In another embodiment, the lights may be arranged in groups or have group addresses. For example, if all of the lights 11 have a unique address, a set of unique addressed lights may be arranged in a group such that all of the lights in a group act as one. Several lights 11 may also be set to the same address to effectuate the grouping. One skilled in the art will appreciate that there are many methods for grouping lights 11 or other devices, so that the present invention is not limited to any particular method of grouping. Grouping the lights 11 can be useful in customizing the desired lighting effects. For example, several lights 11 may be grouped as a first address 20, and several lights may be grouped as a second address 22. The user may speak into a microphone 3, or other transducer, and direct the commands to the grouping in address 20. Upon identification and command language, the group of lights corresponding to address 20 may respond accordingly. The lights of address 20 may be lighting an archway for example while the lights of address 22 are lighting a wall of a building.

Figure 3:
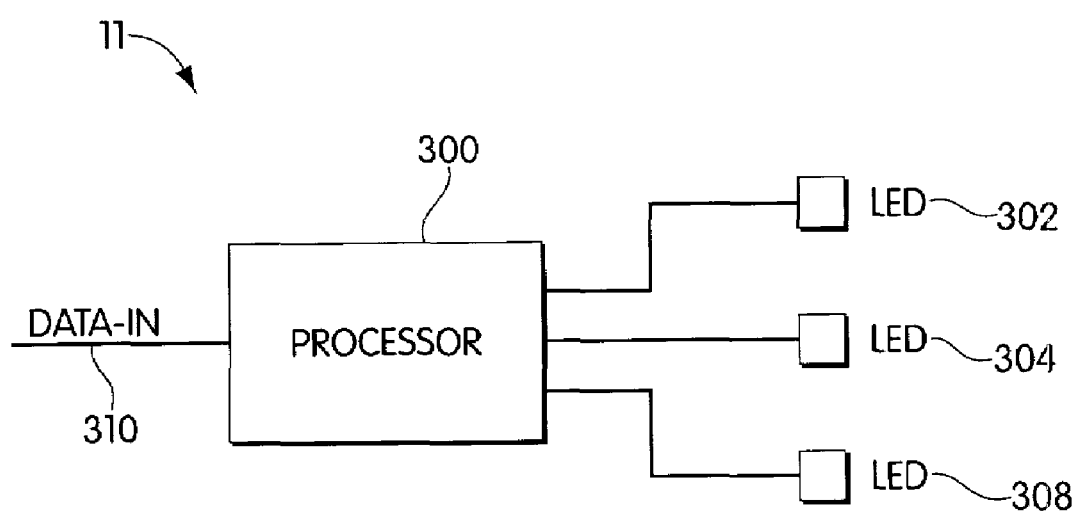
FIG. 3 illustrates a lighting device that can be used in voice controlled lighting systems according to embodiments of the present invention.

In one embodiment shown in FIG. 3, a light 11 may include a processor 300 wherein the processor can receive commands through a data port 310 and control, in response to the commands, at least one LED 302 as indicated in FIG. 3. In one embodiment, the processor may independently control multiple LEDs 302, 304, and 306. This may be useful where the control of color changing lighting is desired. For example, the three LEDs 302, 304, and 306 may be red, green and blue and the processor may be able to control the output of each LED such that the emitted color from the light 11 changes. It should be appreciated that the present invention is not limited to use with lights configured as shown in FIG. 3, as numerous other configurations are possible, including different numbers of LEDs or light sources other than LEDs.

If the speech is unintelligible or the command nonsensical, then the system can respond with an error message. This can take the form of an indicator including the lights themselves, a display, or, to keep the interface uniform, can be voice-generated output.

A number of speech recognition programs are available from a number of companies such as SpeechWorks, Dragon Systems, IBM and others. Some of these systems provide a modularity that allows developers to incorporate speech recognition in their platforms and systems. In an embodiment of the present invention, a standard microphone may be used to provide speech input to a computer-based system that takes that input, digitizes it and then uses a speech recognition component to provide commands. Because the grammar and syntax of the command set is known and the context is known, this winnows down the possibilities of interpreting the speech input a great deal. This then provides for a simpler interpretation process and allows the speech recognition module to deliver a compact 'language' for the Command Interpreter to execute.

In an embodiment, the command set provides for the concatenation of a few simple commands. The first is an attention getter for the system so that normal conversation doesn't result in unwanted interpretations. (Similar to when they say "Computer, <command>" on Star Trek.)

Commands can take the form of objects (e.g. a room, a specific light, a group of lights) and actions or values. These commands can be concatenated to form a full 'sentence' of description.

Examples:
<System call><object><value>
"Light Room redder"—results in incremental change in light output
"Light Room RGB 128 128 128"—results in light output with RGB values and default brightness.
"Light Desk warmer"—results in an incremental decrease in color temperature of a desk light.

All means for describing color can be used ranging from detailed technical means such as coordinates of the CIE diagram or Color Temperature values, to far more general 'warmer', 'redder', 'darker', 'lighter' values or turning on and off as well as commands to indicate duration and effects such as "Light Room Effect Rainbow." In an embodiment, voice commands may be used to set a new effect. In an embodiment, the light may be set to a particular setting and that becomes a new default. Other examples of commands may include:

"Light Room Name Party" or "Light Room Name Romance" (depending on the desired mood)

Timing can also be set from such a construct: "Light Room Turn-on ten o'clock"

In an embodiment, the lighting effects may transition between addressed lights 11 or groups of lights 20 and 22. For example, the effect or value of "effect rainbow" may initiate a lighting program that starts a first light 11 and then moves to a second light 11. The first light 11 may cycle through the colors of the rainbow starting with the color blue and the second light 11 may also cycle through the same colors but the blue will be offset in time from the first light 11 such that it appears as though the light is moving through the room. One with ordinary skill in the art would appreciate that there are many lighting effects that can be generated on networked and non-networked lighting systems and the present invention is not limited in any way to a particular effect.

Color is visually represented in several ways including the CIE diagram and other diagrams such as hue wheels, or Munsell spaces or even Pantone colors. These visual representations can be used as a model for directing direction and change such as saying coordinates of a color, but a more natural way is to modify a color by directing it to be redder, darker, whiter, more saturated etc. Thus, a language and syntax can be provided for enabling simplification of the description of color effects, so that voice commands can be used to create a wide variety of such effects in a room or on an object.

Other commands can allow change until a 'stop' is reached or the color reaches a limit. For example, "House Room Darken" could begin to dim the lights until the command "Stop" is heard. If no command is heard the dimming would continue until the light turns off or reaches some limiting value.

As used herein, the term "LED" should be understood to include light emitting diodes of all types, light emitting polymers, semiconductor dies that produce light in response to current, organic LEDs, electro-luminescent strips, and other such systems. "LED" may refer to a single light emitting diode having multiple semiconductor dies that are individually controlled. It should also be understood that the term "LED" does not restrict the package type of the LED. The term "LED" includes packaged non-packaged LEDs, surface mount LEDs, chip on board LEDs and LEDs of all other configurations. The term "LED" also includes LEDs packaged or associated with material (e.g. a phosphor) wherein the material may convert energy from the LED to a different wavelength.

While the invention has been disclosed in connection with the preferred embodiments shown and described in detail, various modifications and improvements thereon will become readily apparent to those skilled in the art. Accordingly, the spirit and scope of the present invention is to be limited only by the following claims and their equivalents.

The invention claimed is:

1. A color-based lighting system comprising:
    a transducer to take in voice signals and convert the voice signals into electrical signals;
    at least one lighting device comprising at least a first light source adapted to emit light of a first color and a second light source adapted to emit light of second color, the first color being different than the second color, the at least one lighting device being configured to combine at least the light of the first color and the light of the second color to produce at least a third color; and
    a computing device, coupled to the transducer and the at least one lighting device, to convert the electrical signals into control signals adapted to control emission of the first light by the first light source and the second light by the second light source.

2. The system of claim 1, wherein the transducer comprises a microphone.

3. The system of claim 1, wherein at least one of the first light source and the second light source includes at least one LED, such that one of the first light and the second light is produced, at least in part, by the at least one LED.

4. The system of claim 3, wherein the first light source comprises a first LED adapted to emit the light of the first color and the second light source comprises a second LED adapted to emit the light of the second color.

5. The system of claim 4, wherein the at least one lighting device further comprises:
    a processor to control at least one of the first LED and the second LED.

6. The system of claim 5, wherein the processor comprises an addressable processor having an alterable address.

7. The system of claim 1, wherein the at least one lighting device comprises at least one group of lighting devices.

8. The system of claim 1, wherein the voice signals each comprise an identification of an object, and a value.

9. A method of controlling a lighting device comprising at least a first light source adapted to emit light of a first color and a second light source adapted to emit light of a second color, the first color being different than the second color, the method comprising acts of:
    receiving a spoken command;
    translating the command into a signal to be used to control the lighting device;
    in response to the signal, producing the light of the first color and the light of the second color; and
    combining the light of the first color and the light of the second color to produce light of a third color.

10. The method of claim 9, wherein said command is of the form:
    <System call><object><value>.

11. The method of claim 9, wherein said command is a natural language command.

12. The method of claim 9, wherein at least one of the first light source and the second light source includes at least one LED, and wherein the step of producing the light of the first color and the light of the second color comprises producing LED light.

13. The method of claim 12, wherein the lighting device further comprises a processor, and wherein the step of producing the light of the first color and the light of the second color comprises controlling at least one of the first LED and the second LED with the processor.

14. A lighting system, comprising:
    a transducer adapted to receive voice signals and produce corresponding electrical signals;
    a computing device coupled to the transducer, the computing device adapted to produce addressed control signals in response to the electrical signals;
    a plurality of lighting devices each capable of producing light of a plurality of colors and each associated with an addressable processor, each addressable processor configured to control selected ones of the plurality of lighting devices in response to appropriately addressed ones of the addressed control signals.

15. The lighting system of claim 14, wherein the transducer comprises a microphone.

16. The lighting system of claim 14, wherein the plurality of lighting device are configured as a plurality of groups, the lighting devices that comprise a selected one of the groups being configured to be controlled by a same at least one of the addressed control signals.

17. The lighting system of claim 14, wherein at least one of the plurality of lighting devices comprises at least one LED.

18. The lighting system of claim 17, wherein the at least one of the plurality of lighting devices comprises a plurality of independently controlled LEDs.

19. The lighting system of claim 18, wherein the plurality of independently controlled LEDs comprise LEDs of different colors.

20. The lighting system of claim 19, wherein the plurality of independently controlled LEDs comprise LEDs of at least three different colors.

21. The lighting system of claim 14, wherein the voice signals comprise an identification of an object and a value.

22. The lighting system of claim 21, wherein the at least one object corresponds to at least one of the plurality of lighting devices.

23. The lighting system of claim 21, wherein the value comprises a coordinate of a CIE diagram.

24. The lighting system of claim 21, wherein the value comprises a color temperature.

25. The lighting system of claim 21, wherein the value comprises an indication of duration for which light is to be produce by at least one of the plurality of lighting devices.

26. The lighting system of claim 21, wherein the value comprises an indication of a selected lighting mood.

27. The lighting system of claim 21, wherein the voice signal comprises an identification of a lighting effect.

28. The lighting system of claim 14, wherein the voice signal comprises an identification of a hue and a saturation.

* * * * *

UNITED STATES PATENT AND TRADEMARK OFFICE
CERTIFICATE OF CORRECTION

PATENT NO.       : 7,031,920 B2                                                  Page 1 of 1
APPLICATION NO.  : 09/917294
DATED            : April 18, 2006
INVENTOR(S)      : Kevin J. Dowling et al.

It is certified that error appears in the above-identified patent and that said Letters Patent is hereby corrected as shown below:

On Title Page Item [60] should read as follows:
Continuation-in-part of application No. 09/669,121, filed on Sep. 25, 2000, which is a continuation of application No. 09/425,770, filed on Oct. 22, 1999, now Pat. No. 6,150,774, which is a continuation of application No. 08/920,156, filed on Aug. 26, 1997, now Pat. No. 6,016,038[, t]. This application No. 09/917,294, which is a continuation-in-part of application No. 09/815,418, filed on Mar. 22, 2001, which application 09/815,418 is a continuation of application No. 09/213,548 filed on Dec. 17, 1998, now Pat. No. 6,166,496. This application is a continuation-in-part of application No. 09/742,017, filed on Dec. 20, 2000, which application 09/742,017 is a continuation of application No. 09/213,548, filed on Dec. 17, 1998, now Pat. No. 6,166,496. This application is a continuation-in-part of application No. 09/626,905, filed on Jul. 27, 2000, which application 09/626,905 is a continuation of application No. 09/213,659 filed on Dec. 17, 1998. This application is a continuation-in-part of application No. 09/333,739, filed on Jun. 15, 1999, which. This application is a continuation-in-part of application No. 09/215,624 filed Dec. 17, 1998, which. This application is a continuation-in-part of application No. 09/213,607, filed on Dec. 17, 1998, which. This application is a continuation-in-part of application No. 09/213,189 filed on Dec. 17, 1998, which. This application is a continuation-in-part of application No. 09/213,581, filed on Dec. 17, 1998, which. This application is a continuation-in-part of application No. 09/213,540, filed on Dec. 17, 1998, which is a continuation of application No. 09/213,548, filed on Dec. 17, 1998, now Pat. No. 6,166,496, said application No. 09/213,548 is a continuation of application No. 09/213,659, filed on Dec. 17, 1998. Each of the foregoing applications, is hereby incorporated herein by reference.

Signed and Sealed this

Sixteenth Day of December, 2008

JON W. DUDAS
*Director of the United States Patent and Trademark Office*